United States Patent

[11] 3,561,793

[72] Inventor John E. Rode
 Ligonier, Pa.
[21] Appl. No. 854,879
[22] Filed Sept. 3, 1969
[45] Patented Feb. 9, 1971
[73] Assignee Temper Corporation
 Ligonier, Pa.
 a corporation of Pennsylvania

[54] SEAL ELEMENT AND SPACER MEMBER FOR USE THEREWITH
 14 Claims, 9 Drawing Figs.

[52] U.S. Cl. .................................................. 285/13,
 285/422, 285/111, 285/363, 277/180
[51] Int. Cl. .............................................. F16l 55/00
[50] Field of Search ........................................ 285/13, 14,
 110, 111, 112, 422, (MS Dig.), (Gskt. Dig.), 363,
 364, 365, 366, 367, 368; 277/29, 180

[56] References Cited
 UNITED STATES PATENTS
 3,012,802 12/1961 Waite ........................... 285/MS Dig.
 3,089,713 5/1963 Scaramucci ................... 285/111
 3,227,497 1/1966 Heckethorn ................... 277/29
 3,249,119 5/1966 Pollack .......................... 285/14
 3,285,615 11/1966 Trbovich ....................... 277/180
 3,290,047 12/1966 Mayer ........................... 277/180

*Primary Examiner*—David J. Williamowsky
*Assistant Examiner*—Wayne L. Shedd
*Attorney*—Melvin A. Crosby ABSTRACT: The disclosure pertains to the combination of a seal element and a spacer member for being interposed between a pair of parts which confine a fluid passage. The seal element sealingly engages the parts and sealing effect is enhanced by a overpressure inside the seal element. The spacer member surrounds the seal element on the outside and limits the compression of the seal element when the parts are connected together and is formed of a porous powdered metal material so as to drain off from around the outside of the seal element any fluid escaping from the inside of the seal element to the outside thereof.

PATENTED FEB 9 1971 3,561,793

INVENTOR
JOHN E. RODE

SEAL ELEMENT AND SPACER MEMBER FOR USE THEREWITH

This invention relates to sealing and is particularly concerned with static sealing arrangements.

Seals are widely used in industry and are generally employed in instances where a seal is desired between two separable parts (static seal) or between two relatively moveable parts (dynamic seal). The present invention is illustrated and described in connection with separable parts having static seals therebetween. Many different types of sealing arrangements have been devised and are used, including yieldable seals of either rubberlike or metallic materials and hard seals made from fibrous materials or deformable metallic materials. Seals, of course, can be affected between interengaging parts by machining the interengaging surfaces so that they fit together in leak free relation but such seals are expensive and form only a minor branch of seal technology.

The present invention is particularly concerned with static sealing arrangements between separable parts in which a seal element is interposed between the parts and is compressed to a certain degree between the parts. In particular, the present invention is concerned with such seal arrangements wherein the seal element itself is of a yieldable nature with both yieldable and nonyieldable materials being contemplated as a material for the seal element.

Seals between a pair of members depend on the establishing and the maintaining of a leak free engagement of the seal element with the two members which it engages.

In the case of a yieldable seal element, it is of advantage for the pressure of the fluid being contained by the seal element to assist in maintaining the seal engagement of the sealing element with the members which it seals between. In order for the pressure of the contained fluid to be effective for enhancing the effect of the seal element it is essential that there be a pressure differential between one side of the seal element and the other. If the seal element is installed in such a manner that the pressure of the contained fluid can leak past the seal element, even though the rate of leakage is extremely small, the pressure outside the seal element will eventually become as high as the pressure inside the seal element and the seal can then become substantially ineffective and will, at any rate, lose the assistance of the pressure of the contained fluid.

It is usually the case that the parts to be interconnected and sealed, must be firmly and solidly supported and accurately located relative to each other. Under these circumstances it becomes necessary to have a solid bearing of the parts on each other, either directly, or through the medium of a solid member interposed therebetween. The members cannot be solidly supported relative to each other and accurately located if the members are supported solely on a resilient seal element.

In still other cases, the seal element itself is of such a nature that it is adapted for being compressed only to a predetermined degree in order to be effective. Compression substantially greater or smaller than that for which the seal element is designed will interfere with or completely destroy its effectiveness. Resilient metal seal elements of the channel shaped or convoluted design fall within this last classification.

BRIEF SUMMARY OF THE INVENTION

The present invention, in brief, proposes the combination, with two parts to be sealed together, of a resilient seal element interposed between the parts and in sealing engagement therewith, together with a spacer or retainer member interposed between the parts and concentric with the seal element and providing solid support for the parts and characterized in being formed of sintered powdered metal and being porous.

The spacer or retainer member supports and encloses the seal element and supports and locates the parts relative to each other and, when outside the seal element, provides a leakage path for escape of the fluid from the region around the seal element should any fluid escape past the seal from the inside to the outside thereof. The spacer and retainer element, thus, insures that the seal will be properly confined and will be compressed to the proper degree and permits the parts which are sealed together to be bolted together solidly and accurately located relative to each other.

When the spacer is inside the seal element, it shields the seal element from the turbulence of flowing fluids and, furthermore, reduces flexing of the assembly in the region of the seal element.

With the foregoing in mind, a primary object of the present invention is the provision of an improved seal arrangement for sealing between two parts or fluid conducting members.

Another object of this invention is the provision of a combination of a resilient seal element and a member employed with the seal element which acts as a spacer for the parts between which the seal element is disposed.

A particular object of the present invention is the provision of a retainer member for resilient seal elements in which the retainer member is porous and is disposed in surrounding relation to the seal element whereby any fluid escaping from the inside of the seal to the outside thereof is drained off and pressure is prevented from building up on the outside of the seal element.

A still further object is the provision of a resilient seal element and a spacer member inside the seal element which takes the clamping load and which can be porous so as to pass liquid to develop pressure on the inside of the seal element.

These and other objects and advantages of the present invention will become more apparent upon reference to the following detailed specification taken in connection with the accompanying drawings in which.

DETAILED DESCRIPTION OF THE INVENTION

Figure 1:
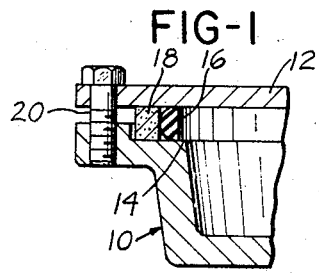
FIG. 1 is a fragmentary view showing a pressure vessel and a cover therefor sealed together by a seal arrangement according to the present invention.

Referring to the drawings somewhat more in detail, in FIG. 1, 10 indicates any sort of pressure vessel adapted to be sealed by a lid or cover member 12. Pressure vessel 10 is provided with a counterbore 14 in which is mounted a resilient seal ring 16 which may be of rubber or rubberlike material and which is in sealing engagement with both the vessel 10 and the lid 12.

According to the present invention, a ring 18 of porous powdered metal surrounds seal ring 16. Ring 18 permits lid or cover 12 to be drawn down by bolts 20 as tightly as desired without developing excessive pressures on seal ring 16 and without excessively deforming the seal element. Furthermore, Ring 18 is porous and should any fluid leak from the inside of seal ring 16 to the outside thereof, this fluid will leak off through ring 18 and prevent the build up of pressure on the outside of the seal ring. A pressure differential across seal ring 16 is thus maintained at all times and the sealing efficiency thereof is, therefore, maintained. Retainer ring 18, furthermore, prevents seal ring 16 from being expanded radially outwardly beyond a predetermined limit which outward expansion could detract from or even destroy the effectiveness of seal ring 16.

In the absence of retainer ring 18, vessel 10 and cover or lid 12 would have to take a solid bearing directly on each other and this might prove disadvantageous, particularly if the material of the vessel and lid happened to be extremely hard or brittle. Furthermore, if lid or cover 12 rested directly on member 10, the interengaging surfaces of the vessel and lid, if machined smooth, would limit the passage of fluid therethrough, and if not machined smooth, would prevent uniform clamping pressure. By the use of powdered metal of retainer ring 18, since the ring 18 is porous, the ring is deformable to at least a small degree and slight irregularities in the surfaces of the pressure vessel and lid engaged by ring 18 would be compensated.

Still further, if the seal, as illustrated, is used in a location where vibration is encountered, the ring 18 is of merit in that it has damping characteristics substantially beyond what can be obtained by the use of solid metal.

The porosity of ring 18 can readily be controlled by regulating the size of the particles of metal from which it is made and the degree of compaction of the powered metal during the manufacturing operation. For seals to retain gas pressures, only a small degree of porosity would be required for ring 18, but for retaining liquid pressures it might be desirable for ring 18 to be of relatively open structure. The ring can be compounded so as to have up to 20 percent or more of the volume open for the flow of fluid therethrough.

Figure 2:
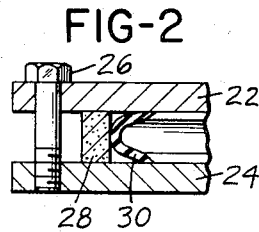
FIG. 2 is a fragmentary view showing two parts sealed together wherein the seal element is a substantially U-shaped rubberlike element.

FIG. 2 shows parts 22 and 24 which are connected together, as by a bolt 26 therebetween, and with a porous powdered metal spacer ring 28 interposed between the parts and in surrounding confining relation to a U-shaped rubberlike seal element 30. The seal element 30, when confined in the manner illustrated, has the extremities of its legs in sealing engagement with parts 22 and 24 and when pressure is developed in the region inside ring 30, this pressure will force the legs of the seal into tight sealing engagement with their respective parts and especially in view of the fact that porous retainer ring 28 prevents the building up of any pressure on the outside of the seal element.

Figure 3:
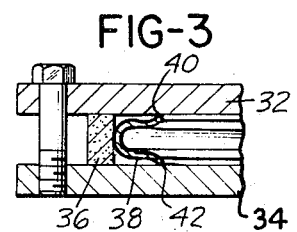
FIG. 3 is a view like FIG. 2, which shows a substantially U-shaped metallic seal element.

In FIG. 3, parts 32 and 34 are innerconnected with a porous retainer ring 36 interposed therebetween and confining a generally U-shaped metallic seal element 38. Seal element 38 operates in the same manner as seal element 30, except that seal element 38 depends on more of a line contact developed at points 40 and 42 at the tip ends of the legs of the seal element. The seal element 38 may be relatively hard and the tips of the legs of the seal element at 40 and 42, may actually penetrate into the respective parts. With the seal element of the nature shown in FIG. 3, it is particularly important to prevent the space on the outside of the seal from becoming subjected to pressure.

Figure 4:
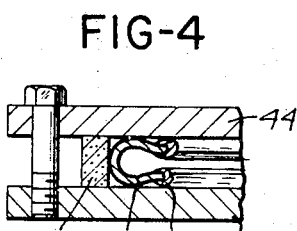
FIG. 4 is a view like FIG. 3, which shows how the tips of the legs of the U-shaped metal seal element could be provided with a soft coating.

In FIG. 4, parts 44 and 46 are retained together with a porous powdered metal spacer ring 48 therebetween and with a substantially C-shaped resilient metallic sealing element 50 confined by retainer and spacing ring 48. The seal element 50 in FIG. 4 operates the same as seal arrangement 38 in FIG. 3, except that the ends of the legs of seal element 50 are provided with a resilient or deformable coating 52 which may be a rubber or rubberlike material, or a material such as Teflon, or a soft metal such as silver.

Figure 5:
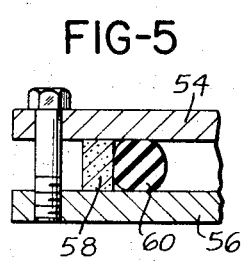
FIG. 5 is a view like FIGS. 2 through 4 which shows a simple O-ring type seal element with a porous retaining ring.

FIG. 5 shows parts 54 and 56 fixed together with a porous powdered metal spacer ring and seal retainer 58 therebetween. Inside ring 58 is a more or less conventional O-ring 60 of rubber or rubberlike material, which is compressed between parts 54 and 56 to a degree sufficient to establish sealing engagement of the O-ring with the said parts. In the case of O-ring 60, it is also highly important for the space outside the ring to be maintained under low pressure and porous ring 58 is highly effective for this purpose as well as for the purpose for preventing radial expansion of the ring.

Figure 6:
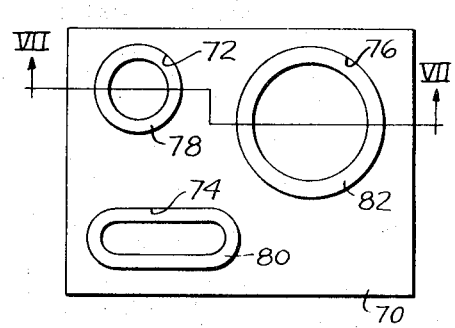
FIG. 6 is a plan view showing a retaining member having a plurality of seal elements therein.

FIG. 6 shows a retainer plate 70 having a plurality of holes 72, 74, and 76 therein with respective seal elements 78, 80, and 82 in the holes. A retainer plate of the nature of that shown at 70 in FIG. 6 might be employed for mounting two parts together which have a plurality of fluid passages therethrough, a pneumatic or hydraulic manifold or valve, for example.

Figure 7:
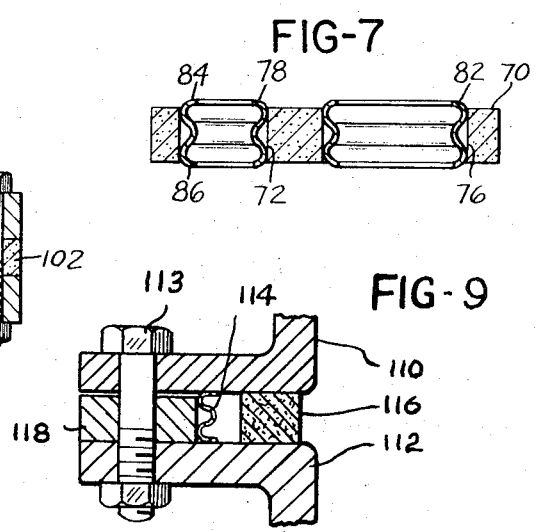
FIG. 7 is a sectional view indicated by line VII—VII on FIG. 6 showing the nature of the seal elements in FIG. 6.

FIG. 7 shows seal elements 78 and 82 and it will be seen that these seal elements are convoluted, being substantially E-shaped or sigma-shaped in cross section. The seal elements are adapted to seal in the annular regions indicated at 84 and 86, removed radially outwardly from the tips of the outer legs of the seal elements. This type of seal element is readily reusable, if not deformed by excessive compression when installed, and does not damage the parts which it engages. The internal pressure within the seal elements according to FIG. 7, tends to expand them axially and thereby to maintain the seal elements in good sealing engagement with the two parts that engage the opposite sides of spacer and retainer member 70. As before, in order for the seal elements to function properly, it is important for the outer surfaces thereof to be maintained at low pressures and the porosity of member 70 provides for this result when the seal elements are in use.

Figure 8:
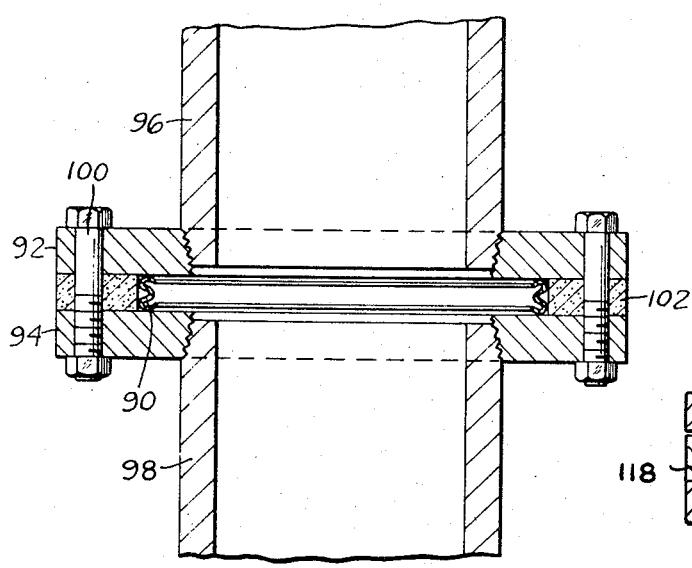
FIG. 8 is a sectional view showing a typical pipe connection between two flanged pipes using a metal seal of the resilient type and a porous retainer ring according to the present invention.

FIG. 8 is a section showing an E-type metal seal element 90 of the same type as is shown in FIG. 7 disposed between a pair of flanges 92 and 94 pertaining to pipes 96 and 98. Bolt means 100 extending through the flanges hold the flanges and pipes fixedly together with a porous powdered metal spacer member 102 therebetween. Spacer member 102 confines seal element 90 and controls the compression thereof and insures that the outer surface of the seal element will be maintained at low pressure at all times.

With metal seal elements of the nature shown, it is highly important to control the degree of compression thereof. Excessive pressure can deform metal seal elements and make them completely ineffective. Such seal elements, when properly used, are effective and inexpensive and can be employed in situations where rubber and rubberlike seal elements would not be usable.

Figure 9:
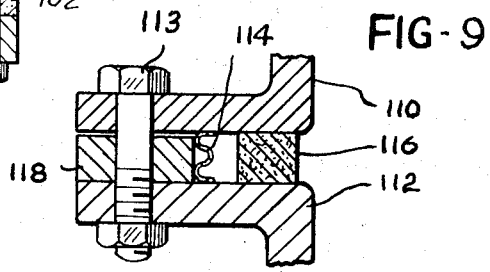
FIG. 9 is a sectional view showing a modification wherein a spacer member is arranged inside the seal element.

In FIG. 9, parts 110 and 112 are to be sealed and are connected together by bolts 113. For accomplishing the sealing, the metal "E" seal element 114 is interposed between the flange portions of parts 110 and 112. Inside the seal element is a porous metal ring 116 which also engages the flange portions of parts 110 and 112. Outside seal element 114 is a ring 118 which preferably has axial clearance from the flange portions of parts 110 and 112. Ring 118 preferably fits about seal element 114 relatively closely so as to support the seal element against radial expansion.

Ring 116, which serves as a spacer, shields the inside of the seal element against the turbulence of the fluid confined by parts 110 and 112 but, due to its porosity, permits the pressure of the fluid to be transmitted to the inside of the seal element to enhance the seal established by the seal element. It will be appreciated that the space between ring 116 and seal element 114 is subjected to a relatively stable pressure with ring 116 acting as a choke to prevent the pressure acting on the inside of seal element 114 from fluctuating as rapidly as the pressure can change in the principal body of fluid inside ring 116.

The outer ring 118, in addition to confining seal element 114 radially, can prevent flexing of the flange portions of parts 110 and 112 beyond a predetermined limit when bolts 113 are drawn up tight.

The combined assembly of inner and outer spacers is particularly useful where the resultant clamping force is desired to be located interior to the seal and thereby reduce or eliminate flexing of the flanges and bolts due to pressurization. When the outer spacer limits the compression, the flange line of contact shifts outwardly as pressure increases. When the inner spacer takes the compression load, the bolts do not feel additional tension as the flange flexes because the resultant line of action of the load remains in the region of the inner spacer. This reduces or eliminates bolt load cycling and, therefore, improves fatigue life of the bolts for pressure cycling applications. Furthermore the seal is not flexed and can remain effective for higher pressures applied to the vessel.

In FIG. 9, ring 118 may also be porous, if so desired.

While several powdered metals can be used for making the spacer member referred to, a spacer made of stainless steel powdered metal either austenitic or martensitic stainless steel or nickel allow presents specific advantages:

A. Withstands high or cryogenic temperatures;
B. Resists corrosion;
C. Provides high compressive strength without requiring broad clamping area. Also note that the effective modulus of elasticity of powdered metal parts is approximately proportional to the inverse of the percentage of pore volume and so more clamping energy can be stored in a spacer of relatively low modulus.
D. Provides fairly rigid radial restraint when surrounding the seal element, for containing the pressurized seal as compared with other metals, such as aluminum.

In making the powdered metal spacer member, spherical particles are of advantage because porosity of the finished article can be controlled relatively closely.

The powdered metal spacer member is less costly to manufacture than solid metal spacer members held to close dimensional tolerances and are of a particular merit when contours other than circular are to be made.

Modifications can be made within the scope of the appended claims.

I claim:

1. In a seal arrangement for sealing between a pair of adjacent parts which define a passage for confining fluid under pressure when the parts are assembled; a seal element between and in sealing engagement with said parts and exposed on the inside to the fluid under pressure which is confined by said parts, said seal element in relaxed condition being axially longer than the space therefore between said parts when said parts are assembled and the sealing effect of said seal element being enhanced by an over pressure on the inside thereof, and a substantially rigid spacer member arranged between said parts concentrically with said seal element, said parts and spacer member being clamped together in face to face relation to form a unit, said spacer member being porous so as to permit fluid to pass therethrough.

2. A seal arrangement according to claim 1, in which said spacer member is formed of compacted and sintered powdered metal.

3. A seal arrangement according to claim 2, in which said spacer member has up to 20 percent of the volume thereof as open interconnected porosity through which fluid can pass.

4. A seal arrangement according to claim 2, in which said seal element is in the form of an endless metal strip having at least one convolution therein when viewed in cross section, said seal element tending to expand in the axial direction to enhance the sealing effect thereof upon the occurrence of overpressure on the inside of the seal element.

5. A seal arrangement according to claim 4, in which said seal element has legs on the opposite axial ends of the seal element directed toward the inside of the seal element and having the radially inner tip ends thereof in sealing engagement with the respective said parts.

6. A seal arrangement according to claim 5, in which the said tip ends of said legs present sharp corners to the respective said parts so as to penetrate into said parts.

7. A seal arrangement according to claim 5, in which the said tip ends of said legs are provided with a deformable coating for engagement with said parts.

8. A seal arrangement according to claim 2, in which said spacer member has vibration damping characteristics and thereby inhibits the transmission of vibrations from one of said parts to the other thereof.

9. A seal arrangement according to claim 2, in which said seal element is substantially U-shaped in cross section.

10. A seal arrangement according to claim 2, in which said seal element is substantially $\Sigma$ shaped in cross section.

11. A seal arrangement according to claim 2, in which said spacer member surrounds said seal element on the radially outer side thereof and engages the radially outer periphery of said seal element and thereby controls the radial expansion thereof.

12. A seal arrangement according to claim 2, in which said spacer member is on the radially inner side of said seal element.

13. A seal arrangement according to claim 12, in which a further member is provided on the radially outer side of said seal element and engages the radially outer periphery of said seal element and thereby controls the radial expansion thereof.

14. A seal arrangement according to claim 13, which includes clamping bolts interconnecting said parts and disposed on the radially outer side of said seal element.